(12) United States Patent
Keong

(10) Patent No.: US 8,869,749 B2
(45) Date of Patent: Oct. 28, 2014

(54) RESTRAINING APPARATUS

(71) Applicant: Steven Kelly Keong, Goomburra Valley via Allora (AU)

(72) Inventor: Steven Kelly Keong, Goomburra Valley via Allora (AU)

(*) Notice: Subject to any disclaimer, the term of this patent is extended or adjusted under 35 U.S.C. 154(b) by 14 days.

(21) Appl. No.: 13/658,916

(22) Filed: Oct. 24, 2012

(65) Prior Publication Data

US 2013/0098312 A1  Apr. 25, 2013

(30) Foreign Application Priority Data

Oct. 24, 2011  (AU) .................................. 2011239290

(51) Int. Cl.
*A01K 15/04* (2006.01)
*A01K 1/06* (2006.01)

(52) U.S. Cl.
CPC .................................... *A01K 1/0613* (2013.01)
USPC ........................................... 119/752; 119/729

(58) Field of Classification Search
CPC ... A01K 1/0613; A01K 1/062; A01K 1/0606; A01K 29/00; A61D 3/00; A61D 2003/003
USPC ......... 119/712, 729, 731, 732, 733, 734, 735, 119/736, 737, 738, 739, 741, 751, 752, 746, 119/814, 815
See application file for complete search history.

(56) References Cited

U.S. PATENT DOCUMENTS

| | | | | |
|---|---|---|---|---|
| 3,221,707 A * | 12/1965 | Pearson | ........................ | 119/731 |
| 3,691,998 A * | 9/1972 | Luinstra | ........................ | 119/734 |
| 3,720,187 A * | 3/1973 | McDonough | ................. | 119/734 |
| 3,814,060 A * | 6/1974 | Swenson | ....................... | 119/734 |
| 3,892,203 A * | 7/1975 | Tieben | ......................... | 119/731 |
| 4,100,886 A * | 7/1978 | Wade et al. | .................. | 119/730 |
| 4,226,212 A * | 10/1980 | Priefert | ........................ | 119/730 |
| 4,302,908 A * | 12/1981 | Parker | ............................ | 49/122 |
| 4,579,084 A * | 4/1986 | McCan et al. | ................ | 119/731 |
| 4,702,200 A * | 10/1987 | Simington | ................... | 119/734 |
| 5,263,438 A * | 11/1993 | Cummings | .................. | 119/734 |
| 5,908,009 A * | 6/1999 | Cummings | .................. | 119/734 |
| 6,609,480 B2 * | 8/2003 | Daniels et al. | ............... | 119/752 |
| 7,770,542 B2 * | 8/2010 | Mollhagen | ................... | 119/734 |
| 8,240,276 B1 * | 8/2012 | Daniels et al. | ............... | 119/729 |
| 8,522,726 B2 * | 9/2013 | Ulrich | .......................... | 119/734 |
| 2002/0139318 A1 * | 10/2002 | Fergusson | ................... | 119/732 |
| 2005/0132978 A1 * | 6/2005 | Bentz | ............................ | 119/732 |
| 2012/0192808 A1 * | 8/2012 | Daniels et al. | ............... | 119/729 |
| 2013/0192538 A1 * | 8/2013 | Ulrich | .......................... | 119/740 |

* cited by examiner

*Primary Examiner* — Trinh Nguyen
(74) *Attorney, Agent, or Firm* — Bay State IP, LLC

(57) ABSTRACT

An animal restraint, or "head bail" apparatus for a livestock handling device has two opposed gates to trap the neck of an animal. The gates are pneumatically operated and lockable at any position by a brake caliper assembly that locks onto a releasable braking member, which slides as the gates operate. The bail apparatus can be used with a cattle crush although it may also be used in applications other than with a cattle crush.

12 Claims, 3 Drawing Sheets

RESTRAINING APPARATUS

CROSS REFERENCE TO RELATED APPLICATION

The present application claims priority from and takes the benefit of Australian patent application No. 2011239290 filed Oct. 24, 2011. The content of said application is hereby incorporated by reference in its entirety.

BACKGROUND OF THE INVENTION

1. Field of the Invention

The present invention is directed to an improved head bail apparatus for use in a livestock restraining device which may include a cattle crush or cattle squeeze. The head bail apparatus is also known as a head restraint, a head gate or a neck yoke.

2. Description of the Related Art

Livestock animals such as cattle need to be periodically restrained to enable the animal to be marked, examined or treated. It is well known to use a livestock restraining device and an example of such a device is a cattle crush or cattle squeeze. The device traps the animal by the neck and does so by a head bail assembly or head gate assembly. The assembly comprises a pair of neck bars which operate between an open "free" position and a holding position. The neck bars can be supported on the side of gates (e.g. baulk gates) which move between the free and holding positions. The movement can be a sliding movement or a swinging movement. The animal is held in position between the neck bars.

It is important that the neck bars hold the animal securely enough to prevent the animal from struggling free. Thus it is known to squeeze the neck bars against the animals neck almost to a choking point and then to lock the bars in position. The initial trapping is achieved using a manual lever on the side of the bail assembly which is lifted up and down to open and close the gates. A toothed ratchet assembly is provided to enable the gates to be locked at various spaced apart positions depending on the size of the animal to be trapped. A disadvantage with this system is that the gates can only be locked at certain positions which correspond to the spacing of the teeth in the ratchet mechanism. Thus is it possible for one spacing to be too large and not able to properly restrain an animal while the next spacing may choke the animal.

An attempt has been made to use strong springs to hold the neck bars against an animal; however if the spring tension is too low, the animal may struggle free and if the spring tension is too high, the animal may choke. Pulleys and chains or wires connected to a spring to hold the animal have also been tried but may suffer from the same disadvantages.

Other devices may be expensive or require powerful motors for operation.

Pneumatic rams may be known to operate the neck bars, but cannot normally hold the captured animal unless the bore size is large enough to create forces which are both dangerous in operation and impractical in use because of the large volumes of compressed air required.

Adjustable locks on the neck bars or head bail doors may be difficult, impracticable and possibly dangerous to use especially if a large horned animal is being held.

Thus there would be an advantage if it were possible to provide a head bail apparatus which could temporarily lock the neck bars at any desired position as opposed to discrete spaced apart positions and which could overcome at least some of the above disadvantages or provide a useful or commercial choice in the marketplace.

Any references to methods, apparatus or documents of the prior art are not to be taken as constituting any evidence or admission that they formed, or form part of the common general knowledge.

SUMMARY OF THE INVENTION

According to a first aspect of the present invention there is provided an animal restraining apparatus comprising:
  a support frame,
  a trapping means operable between an animal release position and an animal restraining position where the animal is restrained in the neck region,
  a drive means to operate the trapping means between said positions, and,
  a releasable brake comprising:
    a braking member which moves upon operation of the trapping means and
    a friction member engageable and disengageable with the braking member to hold the braking member in a particular position thereby locking the trapping means in position.

Thus, broadly, the invention can provide a head bail apparatus for a livestock handling device which has two opposed gates (trapping means) to trap the neck of an animal, the gates being pneumatically operated (drive means) and lockable at any position by a brake caliper assembly locking onto a slide member (releasable brake) which slides as the gates operate.

The bail apparatus can be used with a cattle crush although it is envisaged that the apparatus can be used in other applications other than with a cattle crush.

The trapping means may comprise a pair of trapping members. The trapping members may comprise neck bars or gates (also known as head bail doors), or neck bars on gates. Suitably, the trapping members comprise at least two head bail doors.

The trapping members may reciprocate between the release position and the restraining position. Thus, the trapping members may comprise one fixed member and one reciprocating member, but it is more preferred that the trapping members are both moveable.

The trapping members may be formed from any suitable material. It is envisaged that the trapping members will be formed from metal and particularly steel. However, parts of the trapping members may be formed from other materials such as rubber, or different types of metal such as aluminum. In a preferred embodiment, the trapping members will comprise gates. The gates may comprise a frame to which a metal panel is attached to form a substantially solid gate. Alternatively, the gates may comprise a grid or grate like arrangement, or a perforated panel type arrangement and the like.

The size and shape of the trapping members can vary depending inter alia on the type of animal which is to be restrained. Typically, the shape of the trapping members will be substantially rectangular and the trapping members will typically have a length of between 1-2 m and a width of between 0.4-1 m. This can of course vary to suit. The edges of the gates which restrain the animal may be somewhat curved or may be provided with other shapes and configurations.

The apparatus will typically include some form of support frame. The support frame will typically comprise a pair of opposed vertical support members and an upper or top horizontal support member. A bottom support member may also be provided. The support frame will typically be made of steel and will typically comprise box steel members. Of course, other configurations of the support frame can be envisaged and it is not considered that any particular limitation should be placed on the invention merely by the exemplification of a certain type of support frame. The support frame may function to support the trapping means, the drive means and the releasable brake.

The animal restraining apparatus includes a drive means which can function to operate the trapping means between the restraining position and the release position. The drive means may comprise at least one ram. The ram may comprise a pneumatic ram. The drive means may be connected directly to the trapping means although it is envisaged that the drive means will be connected to an intermediate portion which is connected to the trapping means. The intermediate portion may comprise one or more link members which can rotate or otherwise move to operate the trapping means (typically a pair of opposed sliding gates).

The drive means may enable the one or more link members to move the trapping means between the restraining position and the release position.

The drive means may comprise a cylinder and a piston. The cylinder may be fixed relative to the support frame and the piston may be connected to the intermediate portion. The drive means is preferably supported on an upper part of the support frame.

There may be circumstances where the drive means may comprise a hydraulic ram as opposed to a pneumatic ram. They may be circumstances where the drive means may be other than a ram, for example a high torque and suitably geared electric motor.

The animal restraining apparatus includes a releasable brake which can releasably lock the trapping means in a desired position to enable an animal to be held securely but not to choke the animal. The releasable brake can also function to lock the trapping means at any desirable position, and can provide a very fine control of the spacing between the gates (the trapping means) which is not possible with a conventional ratchet type arrangement.

The releasable brake is preferably supported by the support frame and it is preferred that the releasable brake is provided in an upper part of the support frame and most preferably on top of the support frame. The releasable brake may include a braking member and a friction member. The friction member can frictionally engage the braking member to lock the trapping means in a desired position.

The braking member suitably comprises an elongate member which can be made of any suitable material and a suitable material comprises steel. The braking member may be operatively associated with the trapping means such that movement of the trapping means causes movement of the braking member. Suitably, the braking member can be attached to the upper part of one of the gates such that sliding movement of this gate will cause sliding movement of the braking member.

The elongate member may comprise a substantially rectangular solid flat metal plate which can also be termed a "sword".

The friction member may comprise a brake caliper with a pair of brake pads adapted to frictionally engage the braking member. The friction member may be pneumatically operated. The brake pads may extend on each side of the sword to releasably lock against the sword at a desired position thereby locking the gates (trapping means) in position.

In a preferred embodiment, the releasable brake comprises an air cylinder, a piston extendible and retractable from the air cylinder; the friction member comprising a brake caliper with brake pads adapted to frictionally lock to the braking member, the brake caliper being operatively associated with the piston whereby operation of the air cylinder caused operation of the brake caliper.

The air cylinder and/or the drive means (if the drive means is pneumatic) may be powered by a compressor. The compressor can be supported by the support frame or may be somewhere else and connected by a pneumatic hose to the respective parts of the apparatus.

BRIEF DESCRIPTION OF THE DRAWINGS

Preferred features, embodiments and variations of the invention may be discerned from the following Detailed Description which provides sufficient information for those skilled in the art to perform the invention.
The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
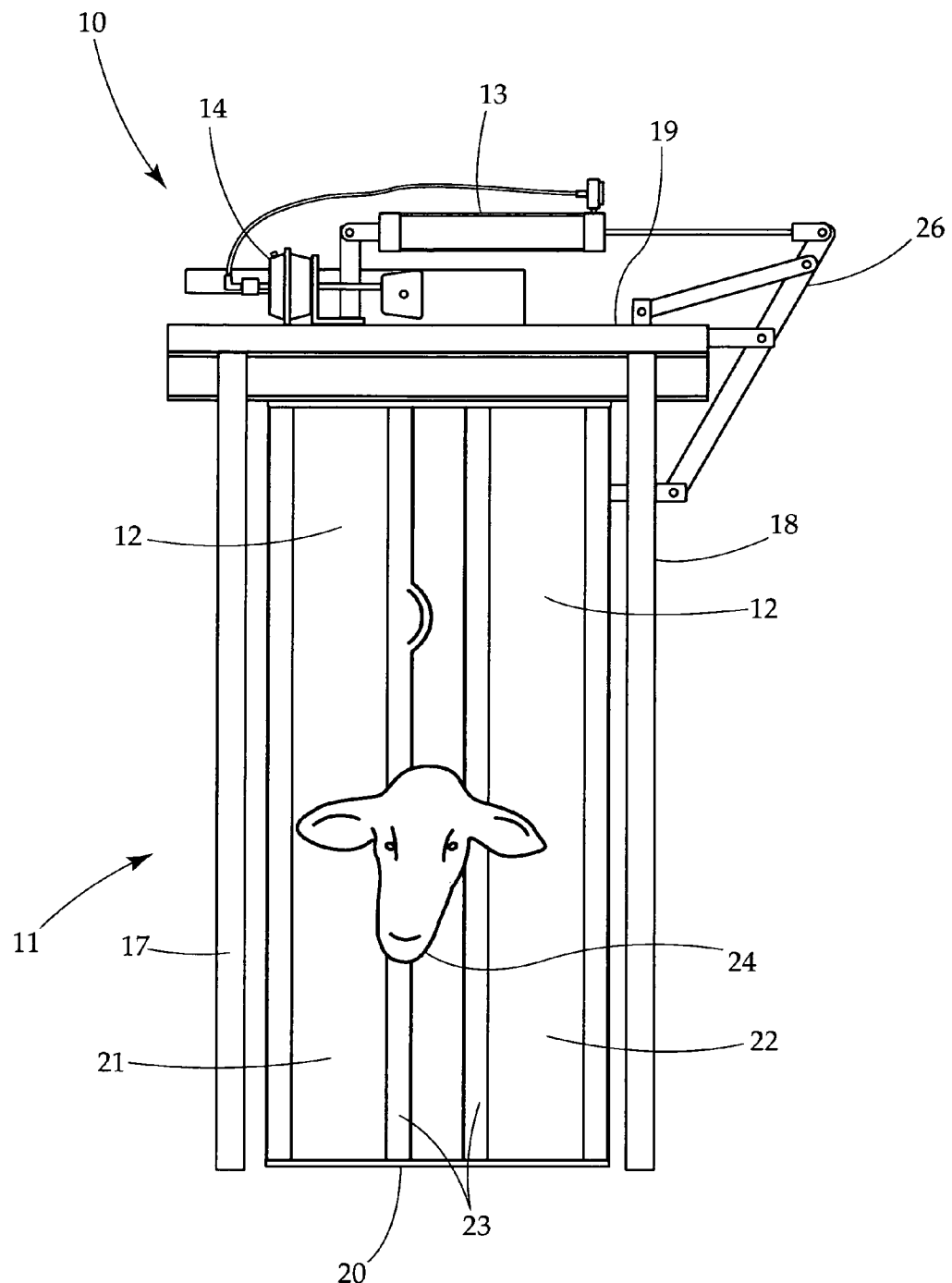
FIG. 1. Illustrates a livestock restraining apparatus and particularly illustrating how an animal is restrained by the neck.

Referring to the illustrations and initially to FIG. 1, there is shown a front view of an animal restraining apparatus 10 according to an embodiment of the invention. The apparatus comprises the following main components: a support frame 11, a trapping means 12, a drive means 13, and a releasable brake 14 which comprises a braking member 15 and a friction member 16. These will now be described in greater detail.

Support frame 11 comprises a pair of vertical steel box section frame members 17, 18 having a length of about 2 m (this can of course vary). A top horizontal frame member 19 made of similar material is welded or otherwise fixed to the upper ends of the vertical frame members 17, 18. A bottom horizontal frame member 20 (see FIG. 1) is fixed to the bottom of the vertical frame members to provide a strong rectangular support frame.

The trapping means 12 in the particular embodiment comprises a pair of gates 21, 22 in the form of rectangular panels made of metal. The gates have inner vertical longitudinal edges on which are fixed neck bars 23 which can trap an animal 24 (see FIG. 1) by the neck. Gates 21, 22 can slide between a retracted release position and a forward restraining position, the forward restraining position being illustrated in FIG. 1. The gates are slidingly supported at the top of the support frame and this can be in a known manner.

Figure 2:
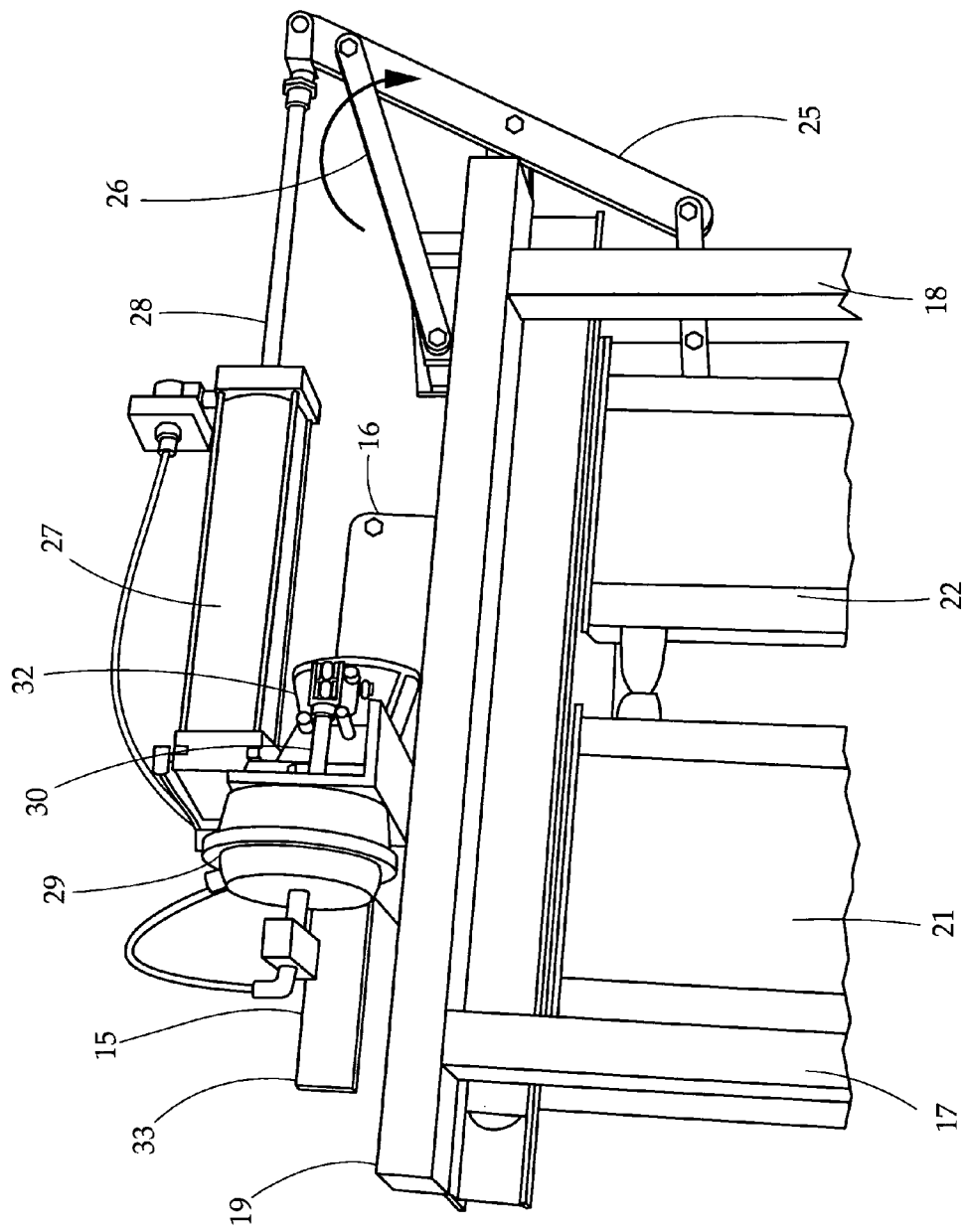
FIG. 2. Illustrates the upper part of a livestock restraining apparatus and particularly illustrating the drive means and releasable brake.
Figure 3:
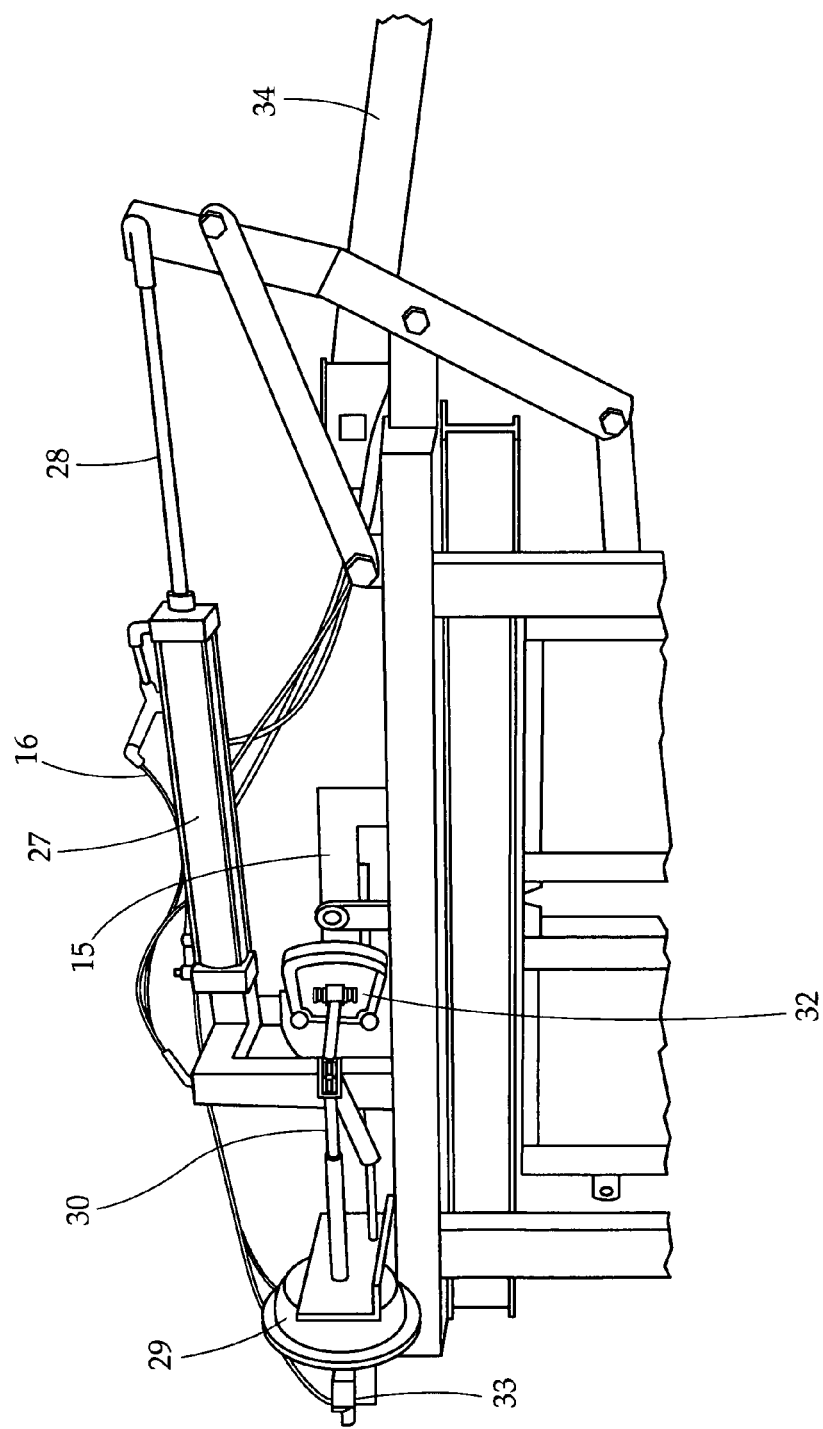
FIG. 3. Illustrates a variation to the apparatus of FIG. 2.

The gates are connected to an intermediate portion 25 which is best illustrated in FIG. 2 and which comprises a series of linked members. Rotation of the linked members in the direction of arrow 26 causes the gates to adopt the closed (restraining) position (see FIG. 1), and rotation of the linked members in the opposite direction causes the gates to open into the release position.

The gates are operated by the drive means 13 which in the particular embodiment comprises a pneumatic ram. The ram comprises a cylinder 27 and an associated piston 28 as is conventional. Cylinder 27 is fixed relative to support frame 11 while the free end of the piston 28 is pivotally attached to one of the linked members comprising the intermediate portion 25 this being best illustrated in FIG. 2. Thus, operation of the ram will cause rotation of the intermediate portion 25 which will cause opening and closing of gates 21, 22. The pneumatic ram is powered by a supply of compressed air from a compressor which may be a petrol or diesel or electric driven compressor which can be connected to the ram using air hoses.

A releasable brake is provided to enable the gates 21, 22 to be locked at any desirable position (which is a better outcome than the spaced apart locking positions provided by a ratchet assembly). The releasable brake is supported on top of the upper frame member 19. In the particular embodiment, the releasable brake is air powered and therefore comprises another pneumatic ram which comprises a cylinder 29 and a short piston 30. Cylinder 29 is fixed to the frame member 19 while the associated short piston 30 is pivotly attached to a link member 31. Link member 31 operates the friction member which, in the preferred embodiment, comprises a brake caliper 32. The brake caliper 32 comprises a pair of spaced apart brake pads (not illustrated) which can move between a braking position and a free position upon operation of the short piston 30.

The releasable brake further comprises a braking member 15 which, in the preferred embodiment comprises an elongate flat and rectangular steel plate 23 which can also be called a "sword". Plate 23 is attached relative to gates 21, 22 is such that the sliding opening and closing of the gates causes plate 23 to slide. Plate 23 extends between the pair of spaced apart brake pads in brake caliper 32. Thus, when the caliper is activated, the brake pads will lock to plate 23 and will prevent further movement of the plate. As the plate is attached relative to gates 21, 22, the locking plate 23 will also lock the gates.

Pneumatic switches (not illustrated) can be provided to operate the drive means 13 and the releasable brake 14 from a safe distance. Air piloted control air valves, speed controllers and the like may be provided. The caliper brake can be adjusted by a length adjustment sleeve on piston 30.

The apparatus provides a simple yet very effective way to securely restrain an animal without choking. The apparatus can be used with a cattle crush or other devices where the apparatus of the invention may find application.

The embodiment can use existing componentry such as an automotive caliper to squeeze the metal plate 33 that is both attached to part of the restraining device (crush doors 21,22) and also riding through the brake caliper 32 containing friction pads.

A pneumatic cylinder (from a generic type of brake booster) and accompanying pneumatic switching can be used to operate the brake to hold the gates in the required position thus locking it and restraining the animal without a choking pressure being maintained. This means that large air pressures and volumes are not required to hold the gates in position and the brake does this.

The flat rectangular "sword" can replace the tooth ratchet in a traditional head stock or bail.

The invention provides a highly cost effective automated bail that has the following advantages:
1. Simple easily understood method of operation.
2. Generic inexpensive components that are easily repaired or replaced in remote locations.
3. Brake lock enables the use of a low volume "drive cylinder" thus enabling the bail to be operated (processing high numbers) using a small petrol powered compressor.
4. The bail may find suitability in less developed countries or regions such as in Africa because of its cost effectiveness and automated capabilities.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

What is claimed is:

1. An animal restraining apparatus comprising:
   a support frame,
   a trapping means operable between an animal release position and an animal restraining position where the animal is restrained in the neck region,
   a drive means to operate the trapping means between said positions, and,
   a releasable brake comprising:
      a braking member which moves upon operation of the trapping means and
      a friction member engageable and disengageable with the braking member to hold the braking member in a particular position thereby locking the trapping means in position;
   wherein the release brake comprises an air cylinder, a piston extandible and retractable by the air cylinder; the friction member comprising a brake caliper with brake pads adapted to frictionally lock to the braking member, the brake caliper being operatively associated with the piston whereby operation of the air cylinder caused operation of the brake caliper.

2. The apparatus of claim 1, wherein the trapping means comprises a pair of trapping members.

3. The apparatus of claim 2, wherein the trapping members comprise neck bars.

4. The apparatus of claim 2, wherein the trapping members comprise gates.

5. The apparatus of claim 1, wherein the trapping members reciprocate between the release position and the restraining position.

6. The apparatus of claim 1, wherein the drive means comprises a ram.

7. The apparatus of claim 1, wherein the ram is a pneumatic ram.

8. The apparatus of claim 1, wherein the braking member of the releasable brake comprises a slide member which slides upon operation of the trapping members.

9. The apparatus of claim 1, wherein the friction member comprises a brake caliper with pair of brake pads adapted to frictionally engage to the braking member.

10. The apparatus of claim 1, wherein the friction member of the releasable brake is pneumatically operated.

11. The apparatus of claim 1, including switches to operate the drive means and the releasable brake.

12. The apparatus of claim 1, including a compressor to operate the drive means and the releasable brake.

* * * * *